No. 879,497. PATENTED FEB. 18, 1908.
H. S. SEARLE.
MECHANISM FOR BOAT PROPULSION.
APPLICATION FILED APR. 17, 1907.
3 SHEETS—SHEET 1.
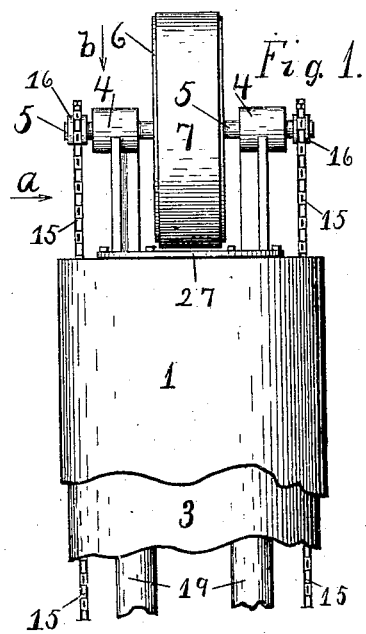
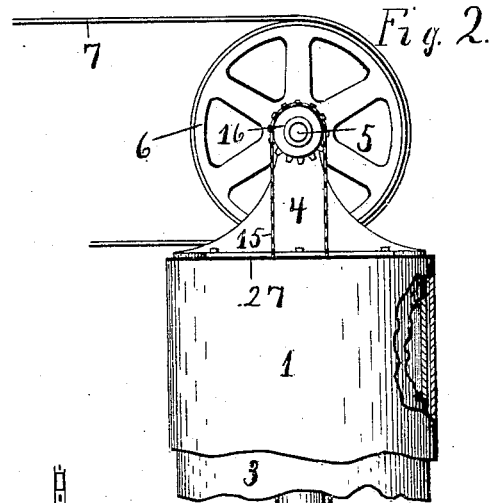
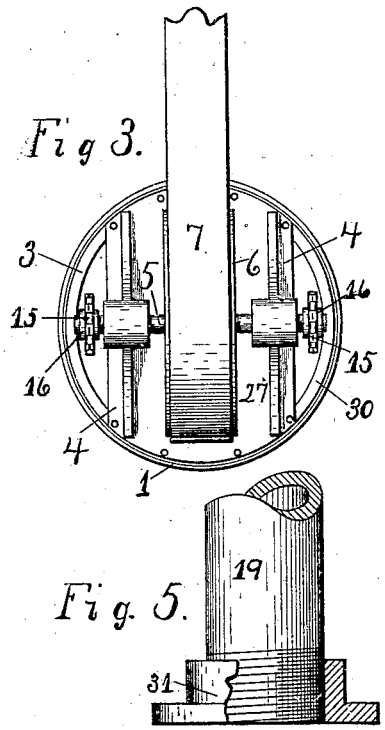
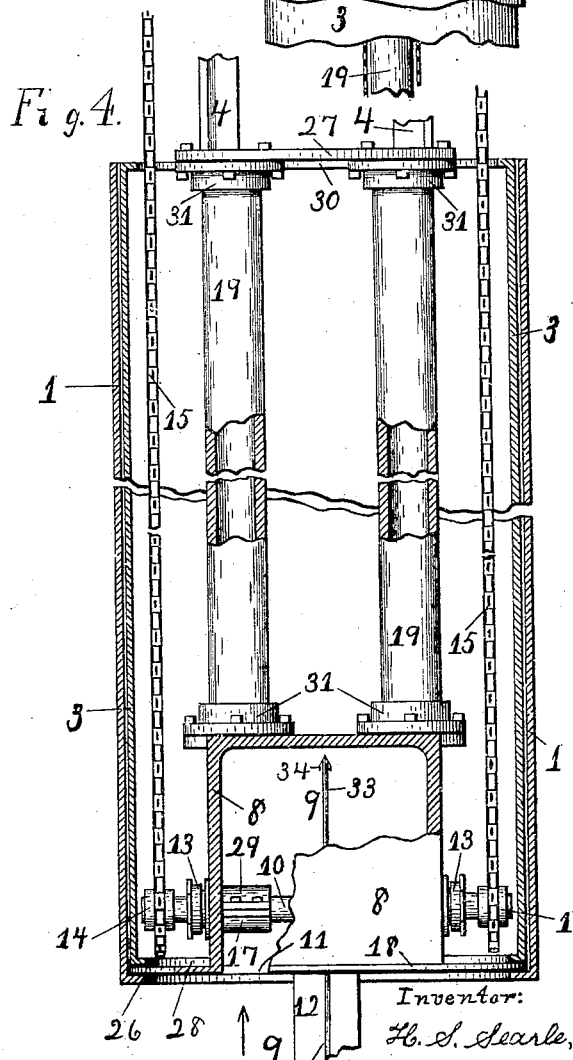
Attest:
A. M. Whitmore
E. E. Dehnert
Inventor:
H. S. Searle,
by E. B. Whitmore, Atty No. 879,497. PATENTED FEB. 18, 1908.
H. S. SEARLE.
MECHANISM FOR BOAT PROPULSION.
APPLICATION FILED APR. 17, 1907.
3 SHEETS—SHEET 2.
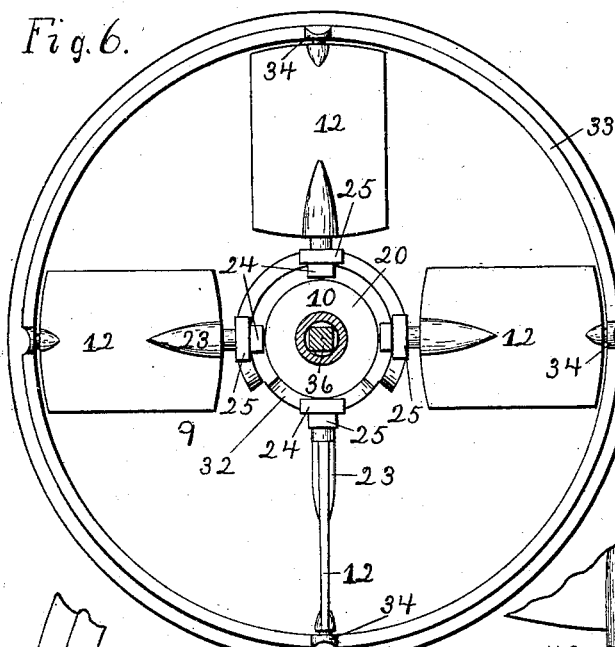
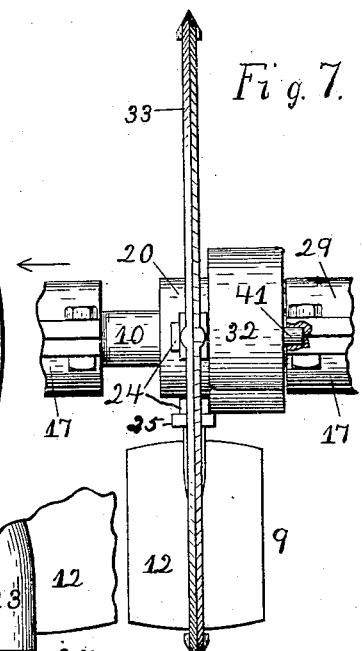
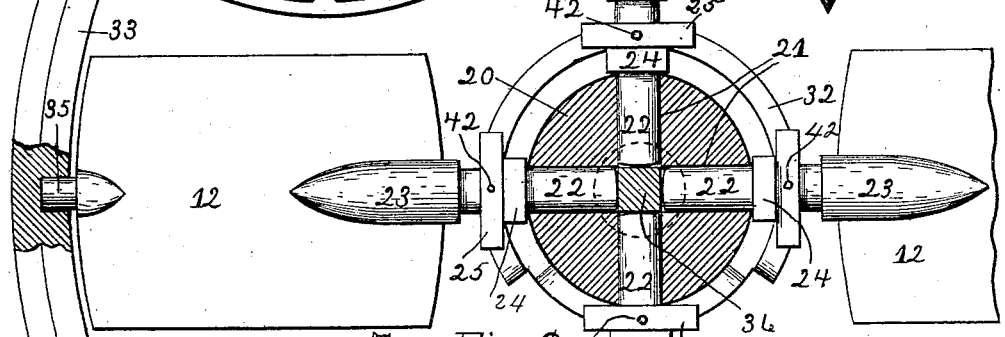
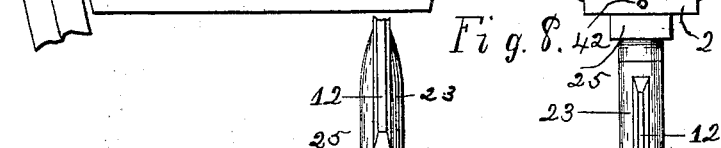
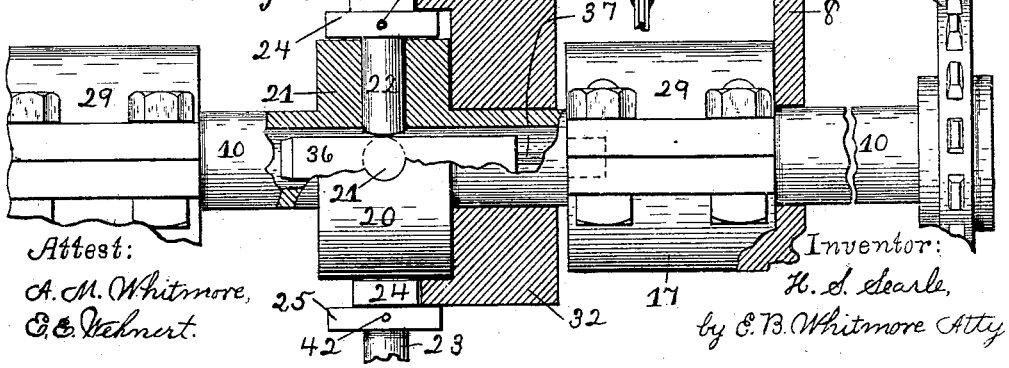
Attest:
A. M. Whitmore,
E. E. Wehnert.
Inventor:
H. S. Searle,
by E. B. Whitmore Atty No. 879,497. PATENTED FEB. 18, 1908.
H. S. SEARLE.
MECHANISM FOR BOAT PROPULSION.
APPLICATION FILED APR. 17, 1907.
3 SHEETS—SHEET 3.
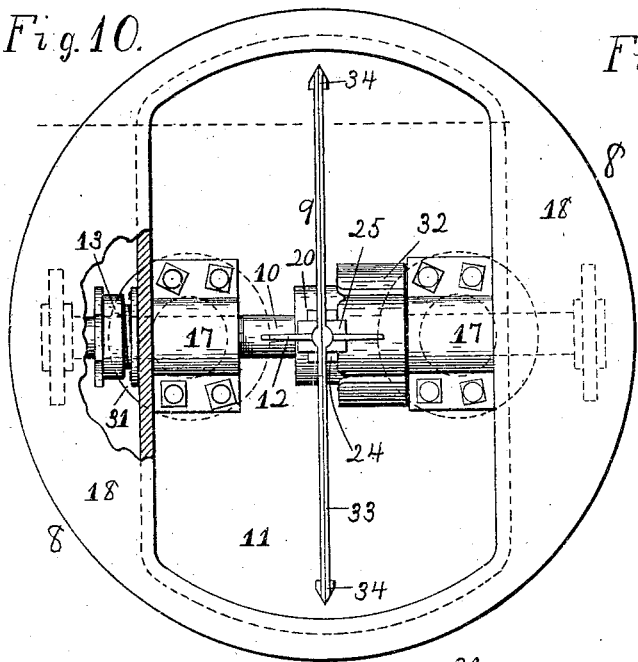
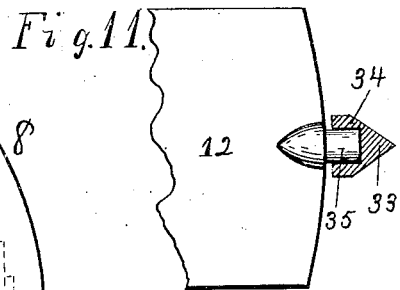
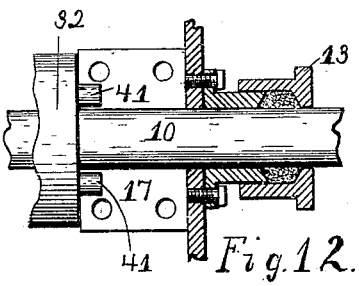
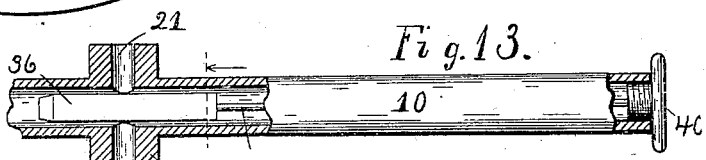
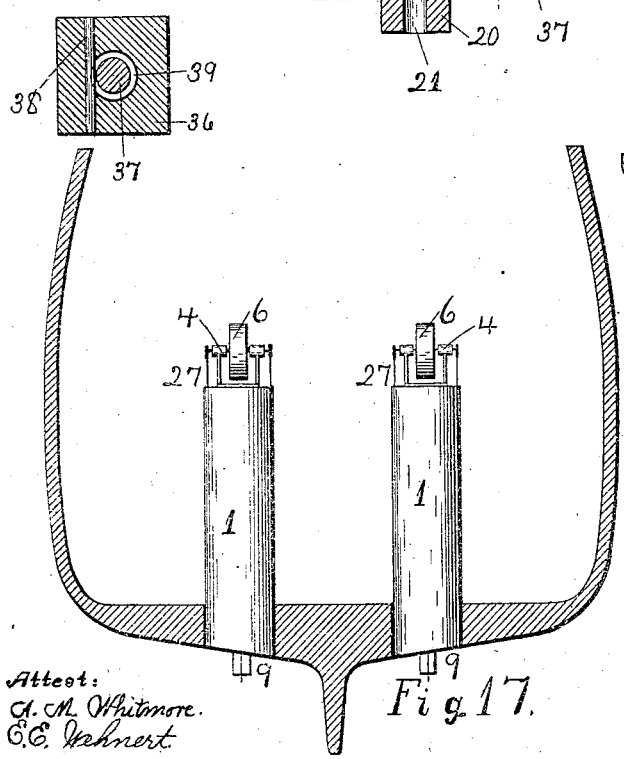
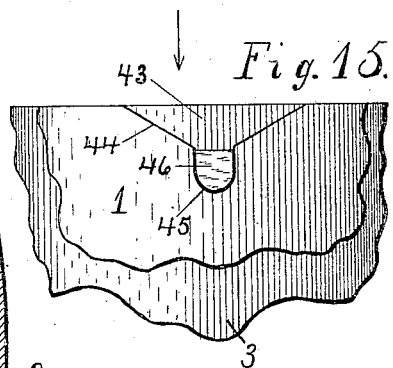
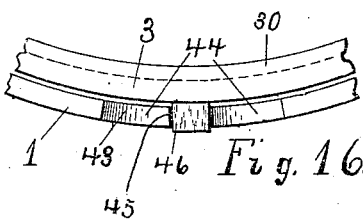
Attest:
A. M. Whitmore.
C. E. Wehnert
Inventor:
H. S. Searle,
by E. B. Whitmore, Atty.
THE NORRIS PETERS CO., WASHINGTON, D. C.

UNITED STATES PATENT OFFICE.

HERMAN S. SEARLE, OF ROCHESTER, NEW YORK.

MECHANISM FOR BOAT-PROPULSION.

No. 879,497.         Specification of Letters Patent.         Patented Feb. 18, 1908.

Application filed April 17, 1907. Serial No. 368,748.

*To all whom it may concern:*

Be it known that I, HERMAN S. SEARLE, of Rochester, in the county of Monroe and State of New York, have invented a new and useful Improvement in Mechanisms for Boat-Propulsion, which improvement is fully set forth in the following specification and shown in the accompanying drawings.

My invention relates to boat propulsion generally but more particularly to the propelling wheels and the manner of operating and applying them to use, the invention being intended as an improvement upon and extension of the invention shown and described in Letters Patent Number 802,602, issued to me October 24th, 1905.

One object of my present invention is to provide bearings for the extreme outer ends of the paddles of the wheels to render their movements more steady and certain, and to cause them to turn more readily in their bearings as they are alternately shifted axially into positions of action and of idleness.

Another main object of the invention is to provide better and improved means and mechanism for adapting the wheels to a vessel.

Other objects and advantages of the invention will be brought out and made to appear in the following description, and the novel features particularly pointed out in the appended claims, reference being had to the accompanying drawings which, with the reference numerals marked thereon, form a part of this specification.

Figure 1 is a side elevation of the upper parts of the device, parts being broken away. Fig. 2 is a side elevation seen as indicated by arrow *a* in Fig. 1, parts being broken away. Fig. 3 is a plan of the upper parts, indicated by arrow *b* in Fig. 1. Fig. 4 is an axial longitudinal section of the lower parts of the structure, parts being broken away and the wheel-house vertically sectioned at the inner face of the near wall. Fig. 5, detached, shows the connection of a column with its base. Fig. 6 is an elevation of a wheel and associated parts the shaft and key being transversely sectioned near the wheel. Fig. 7 is an elevation of parts seen as indicated by arrow in Fig. 6, parts being broken away. Fig. 8 is an elevation of parts, similar to Fig. 6, the wheel-shaft, the key and a portion of the bearing ring being transversely sectioned through the axes of the blade spindles, parts being broken away. Fig. 9 is a side elevation of parts of the wheel-shaft and associated parts, parts being centrally longitudinally sectioned and other parts broken away. Fig. 10 is a view of the wheel-house from beneath, as indicated by arrow in Fig. 4, with the wheel and shaft in place, a part being broken away. Fig. 11 shows a bearing ring in transverse section with a portion of a blade in elevation. Fig. 12 shows in plan a portion of a wheel-house and shaft, with associated parts, the cap of the bearing box being omitted and parts being in central longitudinal section. Fig. 13 shows a portion of a wheel-shaft with parts broken away and centrally longitudinally sectioned to uncover the key and connected parts. Fig. 14 is a transverse section of the axial key taken on the dotted line in Fig. 13. Fig. 15 is a side elevation of parts at the top of the casings, showing the guiding means for the inner cylinder. Fig. 16 is a plan of parts shown in Fig. 15, indicated by arrow in the latter figure. Fig. 17 is a vertical transverse section of the hull of a vessel showing the manner of applying the invention. Figs. 4 and 5 to 16 inclusive are drawn to various scales larger, and Fig. 17 to a scale smaller than that of Figs. 1, 2 and 3.

Referring to the parts shown, 1, Figs. 1, 2, 3, 4 and 17, are a pair of hollow metal cylindrical bodies or casings fixed in vertical positions rigidly in the bottom portion of a vessel, 2, in a plane transverse of the vessel. Both casings are alike, open at the ends, and each formed with an inturned flange 26 at its lower end.

3 is a hollow metal cylinder coaxially within the casing 1, having open ends and an external diameter slightly less than the internal diameter of the outer body 1 so as to be removable therefrom, said cylinder 3 being formed at its ends respectively with inwardly turned flanges 28 and 30, Fig. 4. At the bottom of each of the inner cylinders 3 is placed a wheel-house 8, Figs. 4 and 10, carrying a paddle-wheel 9, on a horizontal shaft 10, Figs. 4, 6–10 and 15, the shaft piercing two opposite sides of the wheel-house as appears in Figs. 4, 9, and 10, and disposed diametrically of the cylinder 3.

The wheel-house 8 is formed with flat vertical sides and circular or cylindrical ends, as appears in Fig. 10, and with a flat circular flange or bottom plate 18 having a diameter equal with the external diameter of the cylinder 3. In putting the wheel-house to place upon the cylinder it is projected upwardly within the latter with its case flange or plate 18 resting against the flange 28 of the cylinder and secured thereto by ordinary means as bolts or rivets, the joint between the flanges being water-tight. When the apparatus is in use and acting, the wheel-house 8 is submerged or under water, and it is a closed chamber except as to a large opening 11 in the bottom plate 18, Fig. 10, downward and outward through which the blades 12 of the paddle-wheel 9 successively swing as the wheel revolves, the blades reaching downward sufficiently to beat the unbroken water below the bottom of the vessel, as appears in Fig. 15.

The wheel-shaft 10 rests in journal boxes 17, Figs. 4, 7, 9, 10 and 12, projecting horizontally inwardly from the parallel walls of the wheel-house, and preferably in one piece therewith, the said boxes being provided with removable caps 29, which with the ordinary clamping bolts, complete the bearings for the shaft. Packing boxes 13, Figs. 4, 10 and 12, are provided for the wheel-shaft where it pierces the sides of the wheel-house to prevent water escaping outwardly around the shaft into the interior of the cylinder 3.

Upon the upper end of the cylinder or body 3 is mounted a saddle 27 provided with a pair of standards 4, Figs. 1, 2, 3, 4 and 17, projecting longitudinally away from the cylinder, and supporting at their outer ends a short horizontal shaft 5 with pulley 6 carrying a driving-belt 7, the saddle being secured as by ordinary bolts to the flange 30 of the cylinder. The saddle is rigidly joined to the wheel-house 8 by a pair of vertical tubular columns or ties 19, Figs. 1, 2, 4 and 5, provided with flanged heads 31, commonly threaded to place, and secured respectively to the top of the wheel-house and to the base of the saddle 27, as clearly shown in Fig. 4. At the overhanging ends of the driving-shaft 5 are secured a pair of sprockets 16, Figs. 1, 2 and 3, carrying chains 15 extending downward onto sprockets 14, Figs. 4, 9 and 10, on the wheel-shaft 10 by means of which the driving-belt 7 is enabled to revolve the paddle-wheels 9 for propelling the vessel.

By means of the connecting columns 19 and the flanged base 18 of the wheel-house 8 the whole mechanism within the outer casing 1, including the paddle-wheel 9, and the saddle 27 with its incumbent parts, may be lifted bodily, and as a single piece, out of and away from the casing 1 when necessary for repairing or for other purposes. This removable mechanism when in place within the casing rests with the flange or plate 18 of the wheel-house directly upon the inturned flange 26 of the casing, as clearly appears in Fig. 4.

The tubular wheel-shaft 10, is formed with an enlarged cylindrical part or ring 20, Figs. 6 to 10 and 13, formed with a series of radial cavities or openings 21 for receiving the inner stems or shanks 22 of the blade-spindles 23, said cavities opening into the hollow of the shaft, as appears in Figs. 9 and 13. These openings are cylindrical and in a plane transverse with the axis of the shaft, they constituting, respectively, journal-bearings in which the spindles turn. The spindles 23 are each provided with a pair of radial spurs 24 and 25 disposed at right angles with each other and with the axis of the spindle, these being similar to the corresponding parts shown and set forth in the Letters Patent above referred to. The inner spurs 24, are normally close to the convex surface of the enlarged part 20 of the shaft 10, as shown, the spurs being longitudinally movable upon the spindles and held to place thereon by transverse bolts or pins 42, Fig. 9. On the shaft 10 is placed, with free fit, a cam body 32, Figs. 6 to 10 inclusive, and Fig. 12, with outer and inner cam faces to act with the respective spurs 24 and 25 to turn the blades 12 successively through one-fourth revolutions alternately into and out of positions of action, as fully set forth in the Letters Patent referred to. This cam body or cam is adjacent to a bearing box 17 and is provided with a pair of longitudinal studs 41, Figs. 7 and 12, entering corresponding cavities in the box to hold the cam from turning with the shaft, the latter turning freely within the cam as the wheel is revolved.

The wheel-shafts 10 are hollow, as stated, and within each is placed in longitudinal position a prismatic key 36, Figs. 6, 8, 9 and 13, having faces to meet the inner slightly projecting convex ends of the blade spindles 23, as shown. The ends of the spindles in contact with the key and the key itself are commonly made hard to resist wear and permit the blades to be turned with least resistance. The keys are each conveniently placed in position and controlled by an axial rod 37 having its inner end movably attached to the key as by means of a transverse pin 38, Fig. 14, occupying a transverse circumferential groove 39, in the rod, which allows the rod to have free axial motion in the key. The rod 37 extends to the end of the shaft 10 being rigid in a head 40, Fig. 13, threaded removably in the end of the shaft, or held by other simple means, by means of which the key may be at any time drawn away from or out of contact with the ends of the spindles 23 or out of the shaft altogether.

A circumferential bearing ring 33, Figs.

4, 6, 7, 8 and 10, is provided for the wheel 9 to support and sustain the outer ends of the blades 12, the ring encircling the extreme ends of the blades, as shown. This ring is formed at its inner edge with small thickened cylindrical parts or bearings 34, Figs. 6, 7, 10 and 11, equally spaced and pierced radially to receive short radial trunnions or journals 35, Figs. 8 and 11, of the paddles, in which bearings 34 the paddles are allowed to freely turn. The bearing ring is made thin and light, as appears in Figs. 6 and 7, with its periphery brought to a knife-edge so as to cut the water and meet with minimum resistance when the wheel is in action. This ring 33 aids materially to hold the paddles accurately in alinement and enabling them to turn in their bearings with the least friction and resistance.

When it becomes necessary at any time to remove the circumferential ring 33 or the blades 12 the head 40, Fig. 13, is unscrewed from the shaft and the key 36 withdrawn sufficiently to release the spindles 23. Then by withdrawing the pins 42, Fig. 8, from the spurs of either blade-spindle it may be depressed or moved endwise farther into the wheel-shaft sufficiently to withdraw its trunnion 35, Fig. 11, from its bearing in the circumferential ring 33. This will release the spindle and it, with the attached blade, may be withdrawn from the wheel-shaft and so be removed from the wheel. Also by withdrawing the key 36 and depressing the spindles successively, as stated, the ring 33 may be removed leaving the spindles in place in the shaft.

As has been stated the cylindrical body 3 may be removed from the casing 1; and means are provided to cause it to occupy an exact relative axial position when in the casing so the paddles 12 will properly act against the water. In Figs. 15 and 16 the upper end of the casing 1 is shown as formed with a notch or angular indentation 43 having inclined sides 44 and vertical hollow or cavity 45, the adjacent part of the body 3 having a laterally-projecting rigid lug or stud 46 in position to occupy the cavity 45, as shown. When the body 3 is being lowered into the casing 1 at any time the stud 46 entering the notch 43 of the casing will be guided into the cavity 45 and so serve to hold the cylinder 3 relatively in place in the casing.

What I claim as my invention and desire to secure by Letters Patent is:—

1. In a mechanism for propelling vessels a casing secured to the hull of the vessel and having an inturned flange, a hollow body within said casing, a wheel-house within said hollow body and having a flange resting on the flange of said casing, a wheel with shaft within said inner body, a driving-shaft carried by said inner body, connectors for said wheel-shaft and the driving-shaft, and means for turning the driving-shaft said hollow body and the parts within the casing being bodily removable.

2. In a mechanism for propelling vessels a casing secured to the vessel and having an inturned flange, a hollow body within the casing and removable therefrom, a wheel-house within said hollow body and having a flange resting on the flange of said casing, a wheel with shaft within said hollow body, a driving-shaft carried by said hollow body, sprockets on said two shafts, and chains on the sprockets said hollow body and the parts within the casing being bodily removable.

3. A mechanism for propelling vessels, comprising a casing secured within the vessel and having an inturned flange, a hollow body within said casing, a wheel-house with wheel and shaft carried at one end of said hollow body, said wheel-house supporting said hollow body and both supported on the inturned flange of the casing, a driving shaft carried at the other end of the hollow body, and means for connecting said two shafts and for revolving the driving-shaft said hollow body and the parts within the casing being bodily removable.

4. Mechanism for propelling vessels, comprising a cylindrical body secured to the body of the vessel, another cylinder within the outer cylindrical body and coaxial therewith, a saddle having standards secured at one end of the inner cylinder and extending longitudinally away therefrom, a driving-shaft in the standards, a pulley and sprocket on the driving-shafts, a wheel-house projecting within the opposite end of the inner cylinder and having a flange secured to said inner cylinder, a wheel-shaft carried by the wheel-house and disposed diametrically within the inner cylinder, a wheel on the shaft within the wheel-house, sprockets on the wheel-shaft and chains connecting said sprockets with the sprockets on the driving-shaft.

5. Mechanism for propelling vessels, comprising two cylinders one within the other the outer cylinder being secured to the vessel, a wheel-house projecting within the inner cylinder and having a base-plate between the end portions of the two cylinders and secured to the inner cylinder, a wheel in the wheel-house and means to support and to turn the wheel.

6. Mechanism for propelling vessels, comprising two coaxial cylinders one within the other the outer cylinder being rigid with the vessel, a wheel-house secured within the inner cylinder, and having opposing inwardly projecting bearing boxes, a shaft in said boxes and projecting without the wheel-house, stuffing boxes around the shaft without the wheel-house, and means for turning the shaft.

7. In a mechanism for propelling vessels a hollow cylinder and means for supporting it, a saddle secured to one end of the cylinder, a wheel-house in the opposite end of the cylinder, a wheel in the wheel-house and means for turning it, there being rigid ties connecting the wheel-house and the saddle.

8. A mechanism for propelling vessels, comprising an outer casing secured to the vessel, a cylinder within the casing and concentric therewith, a saddle with driving shaft projecting from one end of said cylinder, a wheel-house with wheel and shaft projecting within the other end of the cylinder, and rigid connectors for the saddle and the wheel-house, the cylinder with its said connected parts being adapted to be removed from said casing.

9. In a mechanism for propelling vessels, a wheel-house, a hollow shaft with enlarged part held by the wheel-house, a series of radial openings in said enlarged part, a series of blades with spindles occupying said openings and projecting into the hollow of the shaft, and means for turning the blades on their axes, and a removable body in the shaft for controlling the spindles.

10. A mechanism for propelling vessels, comprising a wheel-house, a hollow shaft piercing the wheel-house and having an enlarged cylindrical portion, cavities in said enlarged portion opening into the hollow of the shaft, a series of blades having spindles projecting through said cavities, a prismatic body in the shaft to control the spindles, a rod connected movably with the prismatic body, and a head for the rod seated in the shaft.

11. In a mechanism for propelling vessels a removable wheel-house, a shaft in the wheel-house having an expanded part, radial openings in said expanded part, a series of blades with spindles occupying said openings, means for turning the spindles, and a peripheral bearing ring encircling the blades said wheelhouse and attached parts being bodily removable.

12. A mechanism for propelling vessels, comprising a shaft having a series of openings, a series of blades with spindles in a plane transverse of the shaft occupying said openings, a ring with thin periphery encircling the blades the latter having journal bearings in the ring, and means for revolving the blades and an inclosing hollow body bodily removable with said blades and shaft.

13. In a mechanism for propelling vessels, a removable wheel-house, a shaft carried by the wheel-house, a series of blade spindles projecting from the shaft in a plane at right angles with its axis, a pair of radially projecting spurs disposed at right angles with each other held movably on each spindle, and a relatively motionless element on the shaft engaging the spurs said wheelhouse and attached parts being bodily removable.

14. A mechanism for propelling vessels, comprising a removable wheel-house, a shaft piercing the wheel-house, bearing boxes on the wheel-house for the shaft, a series of radial blade-spindles in the shaft each having a pair of radially projecting spurs disposed at right angles with each other, a cam on the shaft engaging the spurs, and means on the cam engaging a bearing box to prevent the cam from turning with the shaft said wheel-house and attached parts being bodily removable.

In witness whereof, I have hereunto set my hand this 13th day of April, 1907, in the presence of two subscribing witnesses.

HERMAN S. SEARLE.

Witnesses:
    E. B. WHITMORE,
    A. M. WHITMORE.